Patented Feb. 20, 1940

2,190,751

UNITED STATES PATENT OFFICE 2,190,751

VAT DYESTUFFS OF THE ANTHRAQUINONE SERIES

Werner Zerweck and Josef Riedmair, Frankfort-on-the-Main-Fechenheim, Germany, assignors to General Aniline & Film Corporation, a corporation of Delaware No Drawing. Application March 1, 1939, Serial No. 259,133. In Germany March 11, 1938

4 Claims. (Cl. 260—372)

The present invention relates to vat dyestuffs of the anthraquinone series.

We have found that valuable vat dyestuffs are obtainable by introducing according to known methods into the 1- and 4-positions of the anthraquinone molecule two aroyl amine radicals at least one of them being a 3-alkylsulfone-benzoylamino radical if desired the anthraquinone nucleus containing further substituents. Such dyestuffs are, for instance, those of the following general formula:

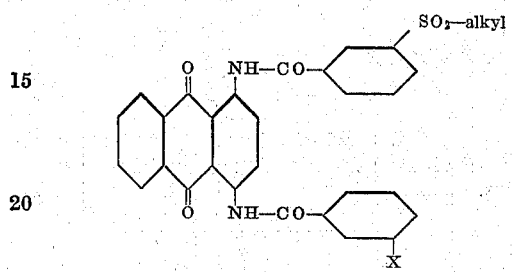

wherein X represents hydrogen or the —$SO_2$-alkyl group.

The introduction of the said groups into the anthraquinone nucleus is performed by acting with two molecular proportions of a 3-alkylsulfonebenzoic acid or a halide or an ester of such an acid on one molecular proportion of 1,4-diamino-anthraquinone, or by acting with one molecular proportion of a 3-alkylsulfonebenzoic acid or the derivatives thereof mentioned above on one molecular proportion of a 1,4-aminoaroylaminoanthraquinone. Furthermore one may act with one molecular proportion of a 3-alkyl-sulfonebenzamide on one molecular proportion of a 1,4-halogen-aroylaminoanthraquinone, or with two molecular proportions of a 3-alkylsulfonebenzamide on one molecular proportion of a 1,4-dihalogenanthraquinone. The anthraquinone compounds employed as starting materials may also contain further substituents in the molecule.

The new vat dyestuffs thus obtained yield on cotton bright scarlet to red dyeings and printings of very good fastness to light.

The dyeings obtained on cotton with the new vat dyestuffs are distinguished from those obtained with the known 1,4-di-(3'-methoxy-benzoylamino)-anthraquinone by their more vivid shades and their improved fastness to light.

The leuco-sulfuric acid esters which are easily obtainable according to one of the usual methods from the new dyestuffs yield printings of very vivid scarlet to red tints of very good fastness to light.

The following examples serve to illustrate the invention but they are not intended to limit it thereto; the parts are by weight:

Example 1

40 parts of 3-methylsulfone-benzoic acid are mixed with about 500 parts of o-dichlorobenzene and 48 parts of phosphorus pentachloride and the mixture is heated for about one hour to boiling, the phosphorus oxychloride formed being allowed to distil off. 23 parts of 1,4-diaminoanthraquinone are introduced into the solution of the 3-methylsulfone-benzoic acid chloride thus obtained and the mixture is heated to boiling for about two hours under reflux. On cooling, the 1,4-di-(3'-methylsulfone-benzoylamino)-anthraquinone formed precipitates in brick-red crystals. It is filtered off, washed with alcohol and dried. The new dyestuff thus obtained is soluble in concentrated sulfuric acid with an orange color and dyes cotton from a bluish-red vat clear scarlet-red shades of very good fastness properties, particularly of very good fastness to light.

Similar dyestuffs are obtained by using in the process described in the foregoing paragraph instead of the 3-methylsulfone-benzoic acid other 3-alkylsulfone-benzoic acids, such as 3-ethylsulfone-benzoic acid or 3-isopropylsulfone-benzoic acid.

Example 2

By introducing into the solution of 3-methylsulfone-benzoylchloride, prepared as described in Example 1, 68 parts of 1-amino-4-benzoylamino-anthraquinone and further working up as indicated therein a red vat dyestuff is obtained which dissolves in concentrated sulfuric acid to a blue-red solution and dyes cotton from a blue-red vat vivid pink tints of very good fastness properties.

The same dyestuff is obtained by causing 1-chloro-4-benzoylamino-anthraquinone to react with 3-methylsulfone-benzamide while adding an acid binding agent, suitably in the presence of a copper salt.

Example 3

10 parts of the scarlet-red vat dyestuff obtainable according to Example 1 and 10 parts of copper powder are introduced into a mixture prepared at 15° C. to 30° C. from 100 parts of pyridine and 20 parts of chlorosulfonic acid. The whole is stirred for about 2 hours at 30° C., until the red dyestuff can no longer be detected. The reaction magma is then stirred into a solution of 40 parts of anhydrous sodium carbonate in about 1000 parts of water, the pyridine is distilled off under reduced pressure and the remaining aqueous solution of the sodium salt of the leucosulfuric acid ester is saturated with sodium chloride or potassium chloride whereby the salt of the ester is obtained in the form of a light yellow precipitate. It is filtered with suction and dried under reduced pressure. A yellow-brown powder is obtained, which when printed according to one of the usual methods for leuco-sulfuric acid esters yields vivid scarlet tints of very good fastness to light.

We claim:

1. The compounds of the general formula:

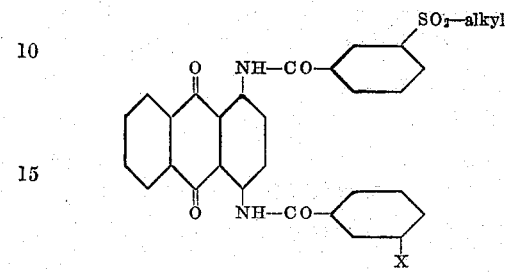

wherein X represents a member of the group consisting of hydrogen and the —SO₂-alkyl group, being vat dyestuffs dyeing cotton vivid reddish tints with good fastness properties.

2. The compound of the formula:

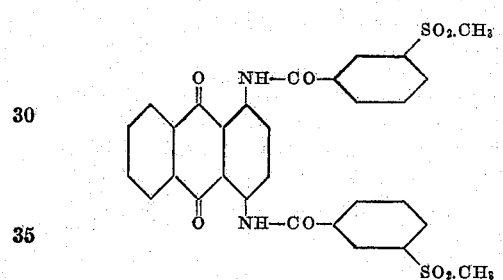

being a vat dyestuff which dyes cotton from a blue-red vat clear scarlet-red tints of very good fastness properties particularly of very good fastness to light.

3. The compound of the formula:

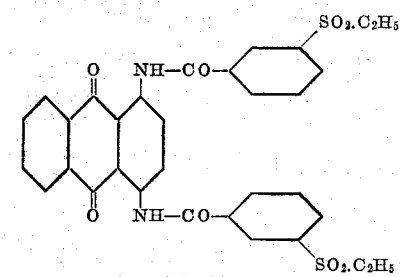

being a vat dyestuff which dyes cotton from a blue-red vat clear scarlet-red tints of very good fastness properties, particularly of very good fastness to light.

4. The compound of the formula:

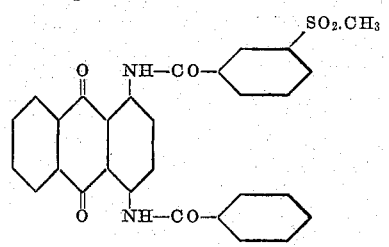

being a vat dyestuff which dyes cotton from a blue-red vat vivid pink tints of very good fastness properties.

WERNER ZERWECK.
JOSEF RIEDMAIR.